United States Patent
Chapman et al.

(10) Patent No.: US 6,296,804 B1
(45) Date of Patent: *Oct. 2, 2001

(54) BIAXIAL STRETCHING OF PLASTIC TUBES

(75) Inventors: Peter Glanville Chapman, Greenwich (AU); Jyri Jarvenkyla, Hollola (FI)

(73) Assignees: Vinidex Pty Limited, New South Wales (AU); Uponor Innovation AB, Fristad (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,141

(22) PCT Filed: Sep. 13, 1996

(86) PCT No.: PCT/AU96/00575

§ 371 Date: Mar. 13, 1998

§ 102(e) Date: Mar. 13, 1998

(87) PCT Pub. No.: WO97/10096

PCT Pub. Date: Mar. 20, 1997

(30) Foreign Application Priority Data

Sep. 15, 1995 (AU) ................................................ PN5475

(51) Int. Cl.[7] .......................... B29C 47/90; B29C 55/14; B29C 55/26

(52) U.S. Cl. ........................ 264/565; 264/150; 264/209.4; 264/209.5; 264/290.2; 264/DIG. 73; 425/326.1; 425/387.1; 425/393

(58) Field of Search ............................. 264/209.5, 290.2, 264/564, 565, 568, 532, DIG. 73, 209.3, 209.4, 150; 425/326.1, 387.1, 393

(56) References Cited

U.S. PATENT DOCUMENTS

| | | | |
|---|---|---|---|
| 3,074,108 | * 1/1963 | Wiley et al. | ............................ 425/66 |
| 4,153,667 | * 5/1979 | Brady et al. | ............................ 264/532 |
| 4,157,235 | * 6/1979 | Lagabe et al. | ............................ 425/71 |
| 4,443,399 | * 4/1984 | Takashige et al. | ..................... 264/519 |
| 4,828,770 | * 5/1989 | Fabian et al. | ......................... 264/40.3 |
| 4,886,634 | * 12/1989 | Strutzel et al. | ....................... 264/560 |
| 5,096,634 | * 3/1992 | Tsadares et al. | ..................... 264/40.2 |
| 5,665,297 | * 9/1997 | Ward et al. | ............................ 264/292 |

* cited by examiner

Primary Examiner—Jan H. Silbaugh
Assistant Examiner—Stefan Staicovici
(74) Attorney, Agent, or Firm—Hayes, Soloway, Hennessey, Grossman & Hage, P.C.

(57) ABSTRACT

A continuous process and apparatus for producing oriented plastic tube comprising the steps of extrusion, temperature conditioning, diametrical expansion and cooling, characterized by the step of inducing axial draw of the tube between first and second haul-off means located upstream of the expansion step.

13 Claims, 2 Drawing Sheets

BIAXIAL STRETCHING OF PLASTIC TUBES

BACKGROUND OF THE INVENTION

This invention relates to process and apparatus for the manufacture of oriented plastics tubes, and in particular to the manufacture of tubes which have been stretched (drawn) in both the circumferential and axial directions to orient the material in the direction of stretching and enhance its mechanical properties.

International Patent Application No. WO 90/02644 describes one process for the manufacture of thermoplastics tubes for example for unplasticised polyvinyl chloride (uPVC) which have a degree of orientation in the circumferential direction that improves properties such as resistance to hoop stresses, and renders the tubes particularly suitable for transmission of water under pressure. The process described in that patent application comprises:

(i) extruding a tube of plastics material;
(ii) temperature conditioning the extruded tube to bring it to a temperature suitable for expansion;
(iii) diametrically expanding the tube by application of an internal pressure to the tube that is limited at its downstream end by a plug that is inflatable or otherwise expandable to maintain pressure within the expansion zone; and
(iv) cooling the expanded tube to set the tube in its diametrically expanded configuration.

To pull the tube through this process line a first haul-off tractor is provided before the temperature conditioning zone and another haul-off tractor is provided downstream of the expansion and cooling zones. Axial draw may be introduced into the product by running the downstream tractor at a higher haul-off speed than the first.

Other processes have been proposed in which the diametrical expansion is achieved by drawing the tube over a solid mandrel. The present invention is applicable also to such processes.

SUMMARY OF THE INVENTION

In a first form, the invention provides a continuous process for producing oriented plastic tube comprising the steps of extrusion, temperature conditioning, diametrical expansion and cooling, characterised in the step of inducing axial draw of the tube between first and second haul-off means located before said expansion step.

A second form of the invention provides a process line for continuous production of oriented plastic tube, comprising an extruder for extruding a tube, temperature conditioning means for bringing the tube to a temperature suitable for expansion, expansion means for causing diametrical expansion of the extruded tube and cooling means for setting the tube in its diametrically expanded configuration, characterised in that first and second haul-off means are located upstream of the expansion means for inducing axial draw of the tube prior to said diametrical expansion.

The term "haul-off means" as used herein is to be understood as referring to means which grip the tube and regulates the axial speed of the tube.

Preferably, the axial draw is induced prior to at least the completion of the temperature conditioning step. In one preferred form, the axial draw is induced concurrently with at least part of the temperature conditioning step. This may be achieved by locating said first haul-off means upstream (relative to the direction of tube travel) of a temperature conditioning zone and locating said second haul-off means between the temperature conditioning and expansion zones.

BRIEF DESCRIPTION OF THE DRAWINGS

Further preferred embodiments shall now be described with reference to the accompanying drawings, in which.

DESCRIPTION OF THE PREFERRED EMBODIMENTS

Figure 1:
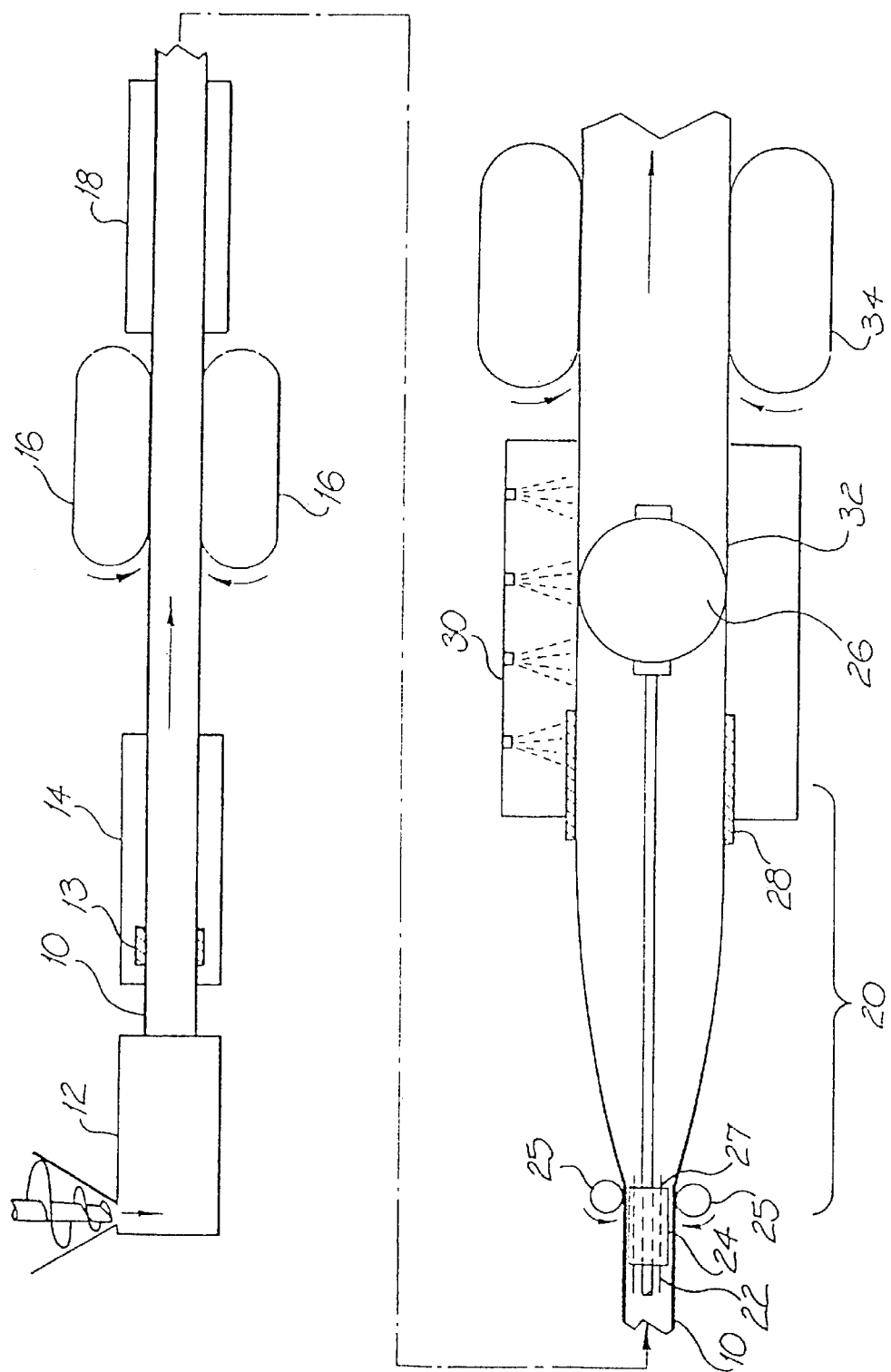
FIG. 1 is a schematic view of the tube manufacture and expansion process.

Referring to FIG. 1, the plastic tube 10 is produced by extruder 12 and is set to correct diameter by a sizing device, such as a sizing sleeve 13, within a primary cooling spray tank 14. The tube 10 is hauled from the extruder by a first haul-off tractor 16.

The tube 10 then proceeds to a temperature conditioning zone 18, in which the tube is contacted with a heat transfer medium such as water to attain a specific temperature profile across the tube wall, at which the subsequent diametral expansion of the tube causes orientation of the polymer molecules principally in the circumferential direction. The orientation results in enhanced physical properties especially increased resistance to hoop stresses. The tube then enters an expansion zone 20 between a pair of plugs 24 and 26 held inside the tube by a service tube 22 connected back through the extruder head to a thrust restraint (not shown).

The first plug 24—the upstream plug relative to the direction of travel of the tube 10—is sized to fit tightly within the unexpanded tube 10. A series of control wheels 25 surrounding the tube circumference push the tube tightly on to the plug 24 so that there is sufficient seal to maintain pressure in the expansion zone.

Figure 2:
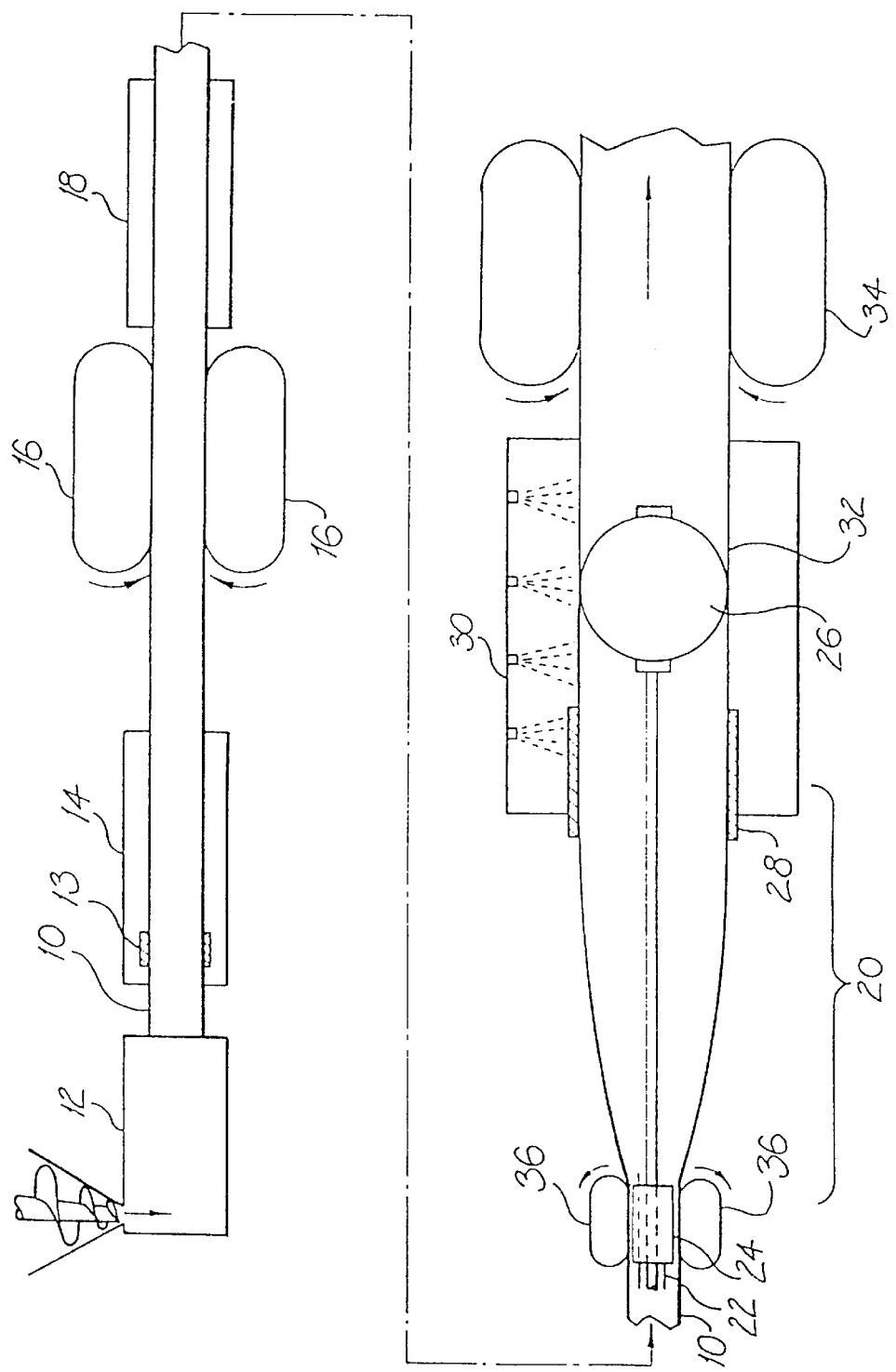
FIG. 2 is a schematic view showing an alternative embodiment.

In the illustrated embodiment, the control wheels 25 are controlled so that they dictate the velocity at which the tube is fed into the expansion zone. This velocity is higher than that of the first haul-off tractor 16 so that a controlled degree of axial draw of the tube is induced before and/or within the temperature conditioning zone. In alternative embodiments, the control wheels 25 can be free running and a separate haul-off means, for example similar to haul-off tractor 16, can be added at the downstream end of the temperature conditioning zone, or a haul-off 36 can replace the wheels 25 at the upstream end of the expansion zone where the tube is internally supported by the upstream plug (see FIG. 2).

Achieving controlled axial draw in the tube wall prior to the expansion zone provides several benefits. Firstly, the thinning of the tube wall which occurs due to the axial draw makes the temperature conditioning more efficient so that greater temperature uniformity around the tube wall can be achieved before expansion and/or a shorter temperature conditioning zone can be employed.

The thinning of the tube wall prior to expansion reduces the pressures and axial thrusts required for the diametral expansion, increasing the stability and controlability of the process. Furthermore, the material is delivered to the expansion zone at a set rate by the second haul-off means, further increasing stability and control.

It will be appreciated that the above advantages apply also to solid mandrel or other diametral expansion means and the present invention applies also to such processes. Also, the axial draw may be used to orient fibres or other particles (such as elongated fillers) in the tube wall, either in addition or as an alternative to producing axial molecular orientation of the polymer material.

The downstream plug 26 is inflatable so that its diameter can be changed from the unexpanded state to the expanded state in order to start the process. The plug 26 is inflated sufficiently to maintain pressure in the expansion zone while allowing some of the expansion fluid to flow past the plug and lubricate the plug within the moving tube. The service tube 22 has a pair of concentric tubes, one of which continues forward to carry inflation fluid, for example air, to the downstream plug 26 and the other supplying expansion fluid, preferably hot water, to the upstream plug, which then enters the expansion zone via outlets 27.

Between the two plugs the plastic tube 10 undergoes expansion in the radial direction due to the internal pressure, without external restraint. Towards the downstream end of the expansion zone, there is provided a sizing sleeve 28 or other sizing device and a cooling spray tank 30 for setting the final diameter of the expanded tube 32. This is followed by a final haul-off tractor 34, which may be set at a higher speed than the second haul-off means 25 if it is desired to achieve additional axial orientation of the tube in the expansion zone, and cutting equipment (not shown). In practice some axial orientation of the tube will usually be generated in the expansion zone due to the axial force exerted on the expanded tube 32 by the final tractor 34. The axial force is required in order to counteract the axial force exerted on the tube in the opposite direction by the pressure of expansion fluid in the expansion zone 20.

The average axial draw of the tube over the whole process line is fixed by ratios of the first and final haul-off tractors. Axial draw may be introduced both in the expansion zone itself and in the pre-expansion zone between the first haul-off 16 and the driven wheels 25. Essentially no axial draw is introduced after the expansion zone as the tube has been cooled. Thus, at any time the sum of the axial draw being introduced in the expansion and pre-expansion zones will be equal to the haul-off ratios between the first and final tractors and therefore constant.

By means of the present invention, it is possible to achieve direct control over how much axial draw occurs in each zone. The inventors have found that this is important both to product consistency and the operation of the process itself.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. In a continuous process for producing oriented plastic tube by the steps in sequence of extrusion, temperature conditioning, diametrical expansion and cooling to produce a tube having a set final diameter, the improvement which comprises the step of inducing axial draw of the tube between first and second tube externally driven haulers prior to said expansion step.

2. In a process according to claim 1, the improvement wherein axial draw is induced prior to completion of the temperature conditioning step.

3. In a process according to claim 1, the improvement wherein axial draw is induced concurrently with the temperature conditioning step.

4. In a process according to claim 3, the improvement wherein said temperature conditioning step occurs within a temperature conditioning zone, said first tube hauler acts on the tube prior to the temperature conditioning zone, and said second tube hauler acts on the tube between the temperature conditioning step and said expansion step.

5. In a process according to claim 4, the improvement wherein the tube is internally supported in the region of a second tube hauler.

6. In a process according to claim 1, the improvement further comprising inducing additional axial draw between said second tube hauler and a further tube hauler after said expansion and cooling steps.

7. In a process according to claim 1, the improvement wherein said expansion is induced by internal fluid pressure retained between upstream and downstream plugs located within the tube.

8. In a process according to claim 7, the improvement wherein said downstream plug is capable of diametrical expansion.

9. In a process according to claim 7, the improvement wherein the downstream plug provides internal support to a part of the tube contacted by said second tube hauler.

10. In a process line for continuous production of oriented plastic tube, comprising, in combination, an extruder for extruding a tube, a temperature conditioner for bringing the tube to a temperature suitable for expansion, an expander for causing diametrical expansion of the extruded tube and a cooler for setting the tube in its diametrically expanded configuration, the improvement which comprises first and second externally driven tube haulers located upstream of the diametrical expander for inducing axial draw of the tube prior to said diametrical expansion.

11. In a process line according to claim 10, the improvement which comprises an additional tube hauler located downstream of said expander and cooler for inducing additional axial draw to the tube.

12. In a process according to claim 1, the improvement which comprises the step of cutting the tube to lengths following said expansion step.

13. In a process line according to claim 10, the improvement which comprises cutting equipment located downstream of the cooler for cutting the tube to lengths.

* * * * *